Dec. 20, 1927.
W. B. FREEMAN ET AL
1,653,356
METHOD AND APPARATUS FOR MAKING TIRE TREADS
Original Filed July 28, 1923    3 Sheets-Sheet 1
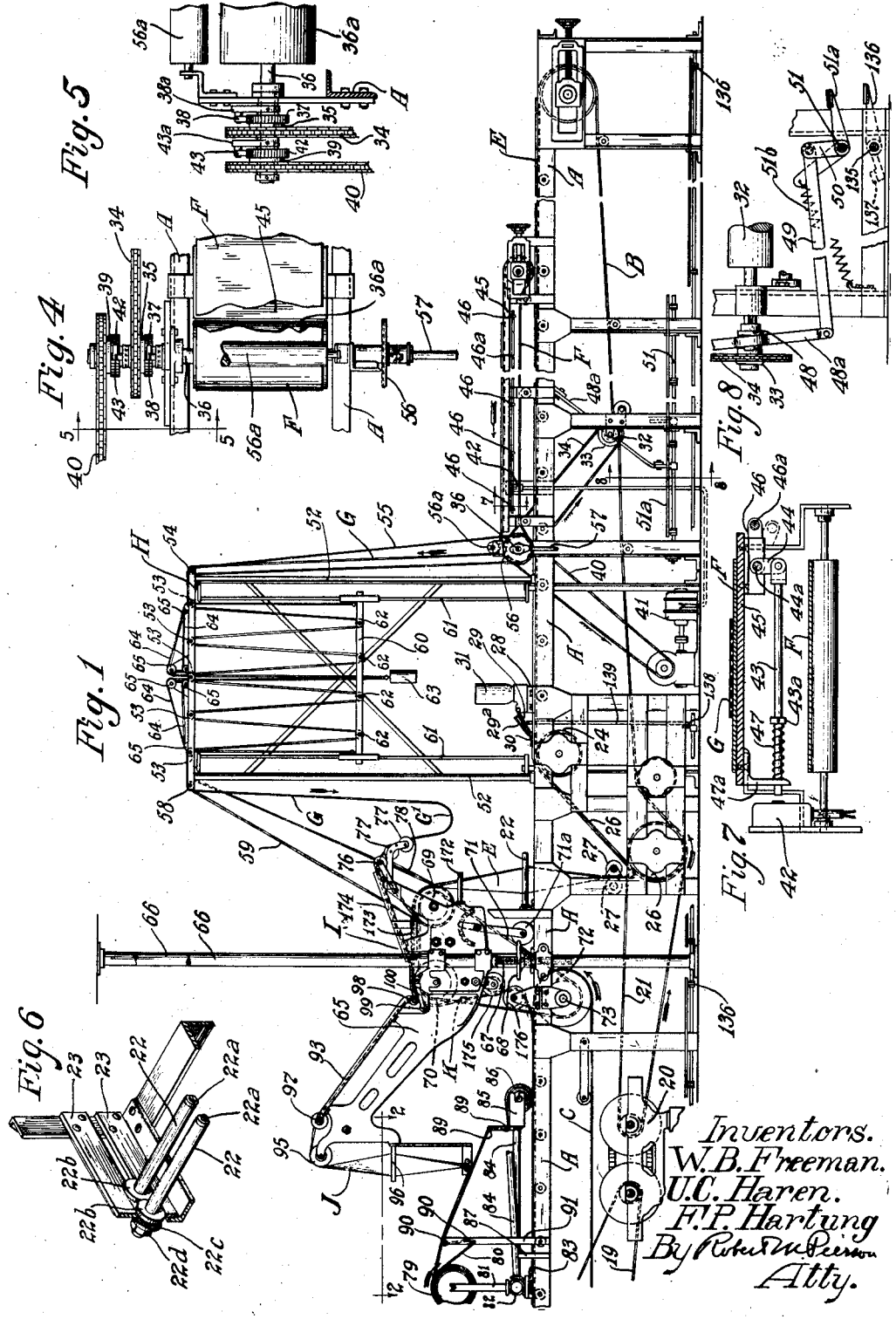
Inventors.
W. B. Freeman.
U. C. Haren.
F. P. Hartung
By Robert M. Pierson
Atty.

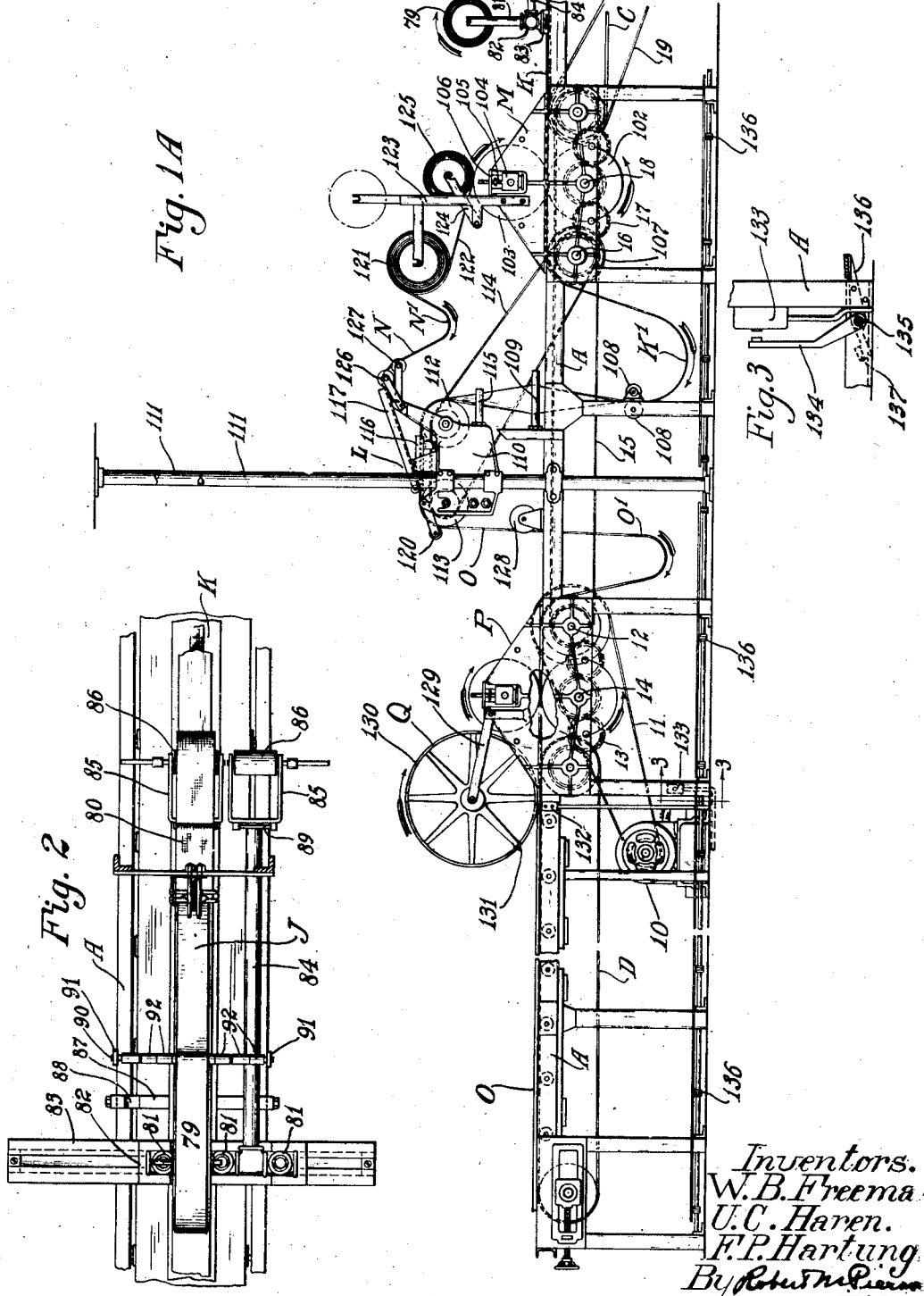

Dec. 20, 1927.  
W. B. FREEMAN ET AL  
1,653,356  
METHOD AND APPARATUS FOR MAKING TIRE TREADS  
Original Filed July 28, 1923   3 Sheets-Sheet 3

Inventors.
W. B. Freeman.
U. C. Haren.
F. P. Hartung.
By Robert M. Pierson
Atty.

Patented Dec. 20, 1927.

1,653,356

UNITED STATES PATENT OFFICE.

WALTER B. FREEMAN, URBAN C. HAREN, AND FLORENZ P. HARTUNG, OF AKRON, OHIO, ASSIGNORS TO THE B. F. GOODRICH COMPANY, OF NEW YORK, N. Y., A CORPORATION OF NEW YORK.

METHOD AND APPARATUS FOR MAKING TIRE TREADS.

Application filed July 26, 1923, Serial No. 654,487. Renewed June 9, 1927.

This invention relates to assembling laminated strip material and more particularly to methods and apparatus for assembling and combining the several component parts of tire treads. An assembled tire tread usually comprises a tread slab of unvulcanized rubber, a relatively narrow breaker-strip or insert of rubberized, coarsely woven fabric laid along the middle of the inner face of said tread slab, and a thin cushion or filler strip of unvulcanized rubber constituting the inner facing of the tread. The tread assembly may also include the sidewall strips, the latter being attached along the edges of the tread slab, preferably overlapping and being joined to the face of the slab opposite the breaker strip and filler strip.

In the manufacture of treads of this character, a common practice is to form the tread slabs by the use of a tubing or extruding machine, cutting the individual slabs to somewhat greater length than required for a tire, and storing the slabs with their ends anchored, as by folding them around the ends of the storage book, to permit the slabs to cool and shrink. After the slabs are cooled, they are, in such practice, cut to the length required for individual treads, and assembled with the breaker and filler strips. Such assembly, although performed by skilled workmen, is slow, and the practice described results in considerable waste because only one tread slab is cut from each length of stock although the latter, as a matter of conveniently anchoring its ends on books somewhat over length may be somewhat longer than required for a single tread.

Our chief objects are to provide an improved method and improved apparatus for assembling laminated strip material, as in the building or assembling tire treads, whereby accurate assembly may be had, labor and material may be saved, and production increased. More specific objects are to provide an improved method and apparatus whereby relatively short lengths of the several materials may first be joined, end to end, to form continuous strips, and the latter then progressively fed into contact with each other to form a continuous tread assembly strip which may be severed into individual treads. A further object is to provide for the simultaneous performance of the several operations, such as splicing the lengths of material and severing the assembled strip, by operators working, with minimum loss of time, at respective stations upon the same installation.

Of the accompanying drawings:

Fig. 1 is a front elevation of the right-hand portion of our apparatus in its preferred form.

Fig. 1ᴬ is a front elevation, in continuation of Fig. 1, of the left-hand, work-delivering portion of the same.

Fig. 2 is a horizontal section of parts of the apparatus, on line 2—2 of Fig. 1.

Fig. 3 is a section on line 3—3 of Fig. 1ᴬ showing a motor stopping device.

Fig. 4 is a plan view, on a larger scale, of a portion of an endless belt driving mechanism therefor, and associated elements, with parts broken away.

Fig. 5 is a vertical section on line 5—5 of Fig. 4.

Fig. 6 is a perspective view, on a large scale, of a pair of work-guides and their mounting.

Fig. 7 is a section on line 7—7 of Fig. 1.

Fig. 8 is a section on line 8—8 of Fig. 1.

Figure 9:
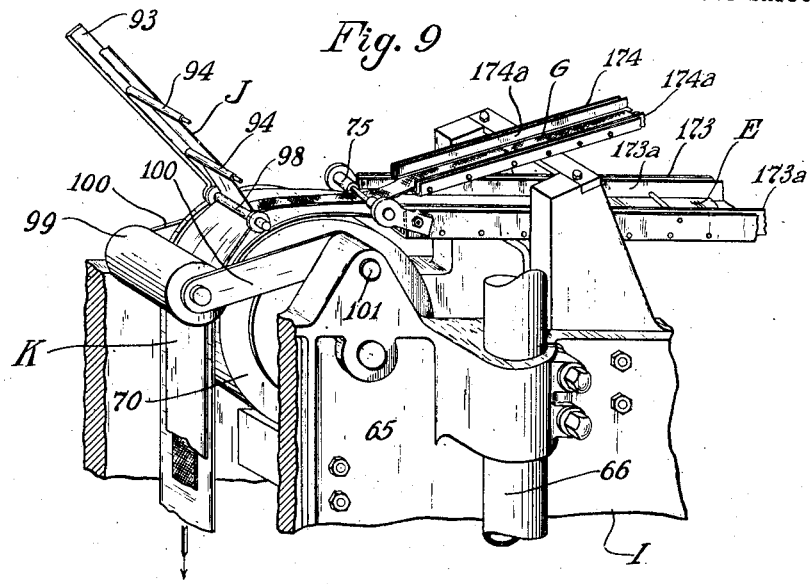
Fig. 9 is a large-scale, perspective, fragmentary view of breaker-strip-applying and filler-strip applying mechanism and the work in place.

General description.

The apparatus comprises a long, table-like frame A in which are mounted, in longitudinal alignment, three endless belt carriers B, C, D, somewhat spaced apart, and adapted to carry forward longitudinally a continuous strip of tread slab material E as the latter is made up by splicing together shorter lengths of such material upon the upper reach of the first belt carrier B, at the right of Fig. 1.

A fourth endless belt carrier F is mounted over and parallel with the carrier B, for splicing together by hand, upon its upper reach, short lengths of breaker-strip material to form a continuous strip G of the latter. A festooning rack H, Fig. 1, is adapted to receive the continuous breaker strip at such variable rate as may be necessary, from said belt carrier F, and give it off at a suitable rate to a breaker-strip-applying and filler-strip-applying device I, (Figs. 1 and 9) the latter being adapted to receive the tread-slab strip E from the belt carrier B, said strip taking an upward course from said carrier B, to apply the breaker strip G and a filler strip J thereto, (Figs. 1 and 9) and to deliver the resulting, composite strip, K, to the belt carrier C.

A side-wall-applying device L, (Figs. 1^A and 10) is adapted to receive the composite strip K from the belt carrier C, through an intervening pressing device M, (Fig. 1^A). to apply thereto side-wall strips N, N (Figs. 1^A and 10), and to deliver the completely assembled tread strip, O, through a pressing device P, to the belt carrier D. The devices are so arranged that the strip K rises vertically to the side-wall-applying device L. A marking device Q (Fig. 1^A) is mounted over said belt carrier D and is adapted suitably to mark the completely assembled strip O to facilitate the cutting of the latter into lengths suitable for individual tire-treads.

*Endless belt carriers and associated parts.*

The three tread-slab-supporting belts, B, C, and D, and the breaker-strip-supporting belt F, except as hereinafter described, are adapted to be driven by a single motor 10, Fig. 1^A. Said motor is adapted, through a sprocket chain 11, to drive a shaft 12, and said shaft is operatively connected through a train of gearing 13, including a shaft 14, with the adjacent end roll of the belt carrier D, and, through a drive belt 15, with a shaft 16 connected, through a train of gearing 17 including a shaft 18, with the adjacent end-roll of the belt carrier C. Said end roll is operatively connected through a drive belt 19, with a Reeves variable-speed-drive 20, the latter being adapted to drive the belt carrier B through a drive belt 21, said variable-speed-drive being interposed in order that such stretch as may be imparted to the continuous slab strip E, prior to its union with the fabric breaker-strip G, may be compensated in the speed of the carrier B with relation to that of the carriers C and D.

For guiding the soft slab strip E in accurate alignment to the breaker-strip-applying and filler-strip-applying device I, a pair of parallel guide rollers 22, 22 (Figs. 1 and 6), adapted to receive said strip between them and guide it by contact with its broad faces, are journaled upon respective stub shafts 22^a, 22^a, the latter being formed at their base ends with flanges 22^b, 22^b and provided with washers such as 22^c and nuts such as 22^d (Fig. 6), by which said stub shafts are adjustably clamped between parallel supporting bars 23, 23, mounted upon the frame A, so that said guide rollers 22 may be adjusted laterally of the course of the work to correct the alignment of the latter or may be moved toward or from each other to adapt them for slab strips of different thickness. In order that the slab strip E may have, between the carrier B and the device I, a sufficient vertical reach in which to be turned flatwise between the rollers 22 and so guided as described without undue strain of its margins, the belt carrier B is so mounted upon supporting rolls 24, 25 (Fig. 1) as to have a work-supporting reach 26 sloping downwardly to its work-delivering position. A pair of guide rollers 27, 27 are journaled on the frame A in position to steady the work as the latter leaves the carrier B and is drawn upward between the rollers 22.

Mounted upon a bridge 28 secured to the frame A and spanning the horizontal upper reach of the carrier B is a solvent-applying device comprising a pivoted wick-holder 29 and a wick 30 therein, the outer end of the wick being adapted to rest upon the slab-strip E as the latter passes thereunder and to progressively apply solvent to the slab-strip, the inner face of said strip being uppermost, and the other end of the wick extending into a well of solvent supplied in a well known manner by an inverted jar 31. 29^a is a set of weight-bars pivoted on the wick-holder 29 and adapted to press the wick against the work.

The belt carrier F is adapted normally to be driven from the belt carrier B, through a roll 32 so journalled in the frame A as to be driven by the lower reach of the last mentioned carrier, said roll having driving connection through a sprocket 33 and sprocket chain 34, with a sprocket 35 rotatably mounted on the shaft 36 of the adjacent end roll 36^a (Figs. 4 and 5) of the belt carrier F. Said sprocket 35 is adapted to drive said roll, counter clockwise as viewed in Fig. 1, through ratchet 37 secured to the sprocket and a pawl 38 on a pawl carrier 38^a secured to the shaft 36, (Figs. 4 and 5) at a determinate speed with relation to that of the carrier B. Also rotatably mounted upon the shaft 36 is a sprocket 39 adapted to be driven, through a chain 40, from a motor 41, said sprocket being adapted, through a ratchet 42 secured to its hub and a pawl 43 on a pawl-carrier 43^a secured to the shaft 36, to drive said shaft 36, on occasion, more rapidly than the carrier B, the pawl 38 running free on the ratchet 37 at such times. The motor 41 is provided with a normally open starting switch 42 (Fig. 7) mounted upon the far side of the frame A, and adapted to be closed from the near side of said frame, by a plunger rod 43 connected with a lever arm 44, depending from a rock-shaft 44ª journalled in suitable brackets on the under side of a rigid table 45 which supports the upper reach of the belt carrier F, said rock shaft extending the length of said table and being provided with spaced, forwardly extending lever arms 46, 46, which have their free ends connected by a bar 46ª, said bar thus being within the reach of the breaker strip operator at all parts of the endless-belt carrier F.

The plunger-rod 43 is normally held out of engagement with the switch 42 against the weight of the bar 46ª by a compression spring 47 interposed between a collar 43ª on said plunger rod and a bracket 47ª through which said rod passes. A clutch 48 is interposed operatively between the roll 32 and the sprocket 33 and is adapted to be shifted by means of a shipper fork 48ª fulcrumed on the frame A and having its free end connected by a link 49 to a lever 50 which is mounted on a foot-operated rocker arm 51 provided with a treadle 51ª, a spring 51ᵇ being provided for normally holding said clutch engaged, this arrangement being such that in normal operation the breaker strip G and the slab strip E are carried forward at substantially the same rate, being spliced up on their respective carriers while the latter are in motion, but the breaker strip carrier F may be either stopped, by means of the treadle 51ª, while the slab-strip carrier B is driven, or said carrier F may be driven (the rod 46 being depressed to close the switch 42) while the carrier B is stopped, or the carrier F may be driven at the same time but at greater speed than the carrier B, so that either the breaker-strip operator or the slab-strip operator may continue at work while the other is inactive.

*Festooning rack.*

The festooning rack H comprises a frame 52 in the top of which are journalled a set of festoon-supporting rolls 53, 53. A feeding-in roll 54 is also journalled in the top of said frame and adapted to be driven by a sprocket-chain 55 from a sprocket 56 secured on the shaft 36 of the carrier F, to feed the breaker strip G into the festooning rack whenever said carrier is driven, said breaker strip passing under a guide roll 56ª journalled on the frame structure of the carrier F. A hand-crank 57 is loosely journalled on the near end of said shaft 36 and provided with clutch teeth adapted to engage complemental clutch teeth on the hub of the sprocket 56 for manually driving the sprocket-chain 55 and carrier F whenever the motor 41 is disabled. A feeding-out roll 58 is journalled in the top of the frame 52 of the festooning rack and adapted to be driven by a belt 59 from the breaker-strip-applying and filler-strip-applying device I, to deliver the breaker strip G to said device whenever the latter is driven, a storage loop G¹ preferably being allowed between the festooning rack and said device.

For maintaining the breaker strip G in festoons of substantially equal length in the rack H, a floating frame 60 is mounted upon vertical guide rods 61, 61, secured to the frame 52 and has journalled therein rolls 62, 62, adapted to be threaded by the work alternately with the rolls 54, 53, 58. A counterweight 63 for the floating frame 60 is connected with the latter by cables 64, 64 passing over guide pulleys 65, 65, on the top of the frame 52, said cables running to opposite ends of the floating frame, so that when the running of the stock into or out of the festooning rack causes unequal tension in the festoons of stock at the respective ends of the floating frame, which in the absence of the counterweight would permit the latter to depart from horizontal position or to bind on the guides 61, such inequality in the tension of the festoons is compensated by the force of the weight 63 being borne mostly by the end of the floating frame which tends to assure the lowermost position, and the floating frame is thus kept in horizontal position by the counterweight while said frame rises and falls in response to the feeding of the stock into or out of the device.

*Breaker-strip-applying and filler-strip-applying device.*

This device, I, comprises a frame structure 65 clamped upon a pair of vertical posts 66, 66, and adapted to be raised or lowered, when its clamps are loosened, by a jack-screw 67 projecting downward from said frame structure through an aperture in a part of the frame A and provided with an operating hand wheel 68 screwing thereon, whose hub bears against said part of the frame A. The frame structure 65 is thus adapted to be adjusted to and clamped in different positions vertically, to provide for a greater or less vertical reach of the slab strip E according to the cross-sectional size and character of the latter, some types of slab strips requiring a longer vertical reach in which to be turned and guided by the rollers 22 as above described.

Journalled in the upper part of the frame structure 65 are two stock-supporting and driving rolls 69, 70, driven by a belt 71 from a pulley 72 on the shaft 73 of the adjacent end roll of the belt carrier C, said rolls being adapted to draw the slab strip E upward between the pairs of guide rollers 27 and 22, and deliver it respectively over and under a pair of flanged, side-guiding rollers 175, 176, mounted on the respective frames 65 and A to the belt carrier C. 71ª is a belt tightener for the belt 71. To supplement the action of the guide rollers 22 as the slab strip rises therefrom, a similar pair of guide rollers, one of which is shown at 172, but spaced farther apart than the rollers 22, project from the frame structure 65, these guide rollers 172 being adapted to contact the edges of the slab strip at a point where it has turned back almost into parallelism with the roll 69 in passing to the latter. The guide rollers 22 and 172 are adapted to center the slab strip, so that its medial line maintains the proper position on the roll 69 for receiving the breaker-strip, notwithstanding variation in the width of the slab strip, and are adapted to cause the slab strip to contact sooner with the roll 69 at one edge than at the other, whereby a very accurate alignment of the strip on said roll may be had. The slab strip, being obliquely disposed with relation to said guide rollers, may yield by flexing to a more oblique position so as not to be impeded in the case of a misaligned splice passing said rollers. A guide trough 173 (Fig. 9) is mounted on the frame structure 65 and adapted to support and guide the slab strip as the latter slides thereover from the roll 69 to the roll 70.

Figure 11:
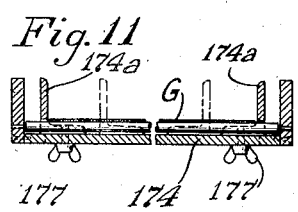
Fig. 11 is a typical transverse section through a stock guiding trough.

For guiding the breaker strip G onto the slab strip E as the latter passes from the guide trough 173 onto the roll 70, an inclined chute, Figs. 1 and 9, is mounted on the frame structure 65 and a waisted, edge-guiding roller 75 (Fig. 9) is journalled adjacent the delivery end of said inclined chute. Flanged guide rollers 76, 77, 77, for the breaker strip G are mounted at the receiving end of the chute 174, the roller 76 being driven by a belt 78 from a pulley secured on the shaft of the roll 69, and a second pulley on said shaft drives the belt running to the feedout out roll 58 of the festooning rack, the rolls 76, 58 being thus adapted to be driven at substantially equal speed so as to maintain the storage loop G¹. The guide trough 173 and chute 174 are of similar construction, each having lateral guides 173ª, 173ª, and 174ª, 174ª, respectively, adapted to be adjusted to accommodate material of various widths, said guides having threaded studs projecting through transverse slots in the floor of the supporting structure, and provided with clamping nuts 177, 177, as shown clearly in Fig. 11.

The filler strip J is supplied from a stock roll 79 (Figs. 1, 1ᴬ and 2) said strip being interwound with a liner 80, and said stock-roll being journalled on journal-notched uprights 81, 81, rising from a dove-tail slide 82 mounted on a transverse guide-way 83 supported upon the frame A and bridging the belt carrier C on the opposite side of the device I from the festooning rack. Three of said uprights 81 are provided, so that two stock-rolls may be rotatably supported thereon at the same time, their journals resting in common upon the middle upright, this arrangement being such that either of the stock rolls may be brought into alignment with the slab strip by movement of the slide 82 on its guideway 83.

Hinged on the slide 82, midway between adjacent stock-roll-supporting uprights 81, are two arms 84, 84, each having on its outer end a yoke 85, the forks of which are notched to receive the journal of a liner-rewinding roll 86 so that the latter may rest upon and be driven by the composite strip K as the latter is carried forward by the belt carrier C, one or the other of the arms 84 being aligned with said composite strip whenever the corresponding filler-strip stock-roll is so aligned by positioning of the slide 82.

For holding said slide in position so to align one or the other of the stock rolls and its liner rewinding roll, and at the same time to hold the other liner-rewinding roll above and out of contact with the belt carrier C, a bar 87, mounted on the frame A, bridges the belt carrier C under the hinge-end portions of the arms 84, said bar having a low middle portion permitting the work-aligned arm 84 to be supported by contact of its liner rewinding roll with the composite strip K, and said bar has a notch, such as 88 (Fig. 2) in its upper face, at each end, in which one of the arms 84 rests while the other is at the middle of the bar, said arm thus being held elevated, with its liner rewinding roll out of contact with the work, and also so held as to prevent displacement of the slide 82.

For guiding and tensioning the liner 80 as it passes from the stock roll 79 to the liner rewinding roll 86, a pair of guide tension bars such as 89, 89, (Figs. 1 and 2) are mounted upon each of the yokes 85, and a pair of bars or shafts 90, 90, bridging the carrier C, are mounted in uprights 91, 91, rising from the frame A. Each of said shafts preferably has mounted thereon a set of cylindrical tube-sections or rolling collars such as 92, 92, (Fig. 2), to permit relatively free running of the liner at that position, and said shafts are so positioned as to cause the liner, the latter being threaded about them as shown clearly in Fig. 1, to leave the stock roll at a different tangent from that of the filler strip J, the latter being drawn forward from the roll by the reach of liner between the shafts 90 and the guide-tension bars 89, this arrangement, the liner and the filler strip passing on opposite sides of the lower shaft 90, assuring that adhesion between the two will be broken before the filler strip is carried on the liner to a position from which it is drawn upward, leaving the liner, to the applying device I.

Said device I includes an inclined filler-strip-guiding chute 93, one side member of which is omitted for clearness of illustration, (Figs. 1 and 9). The floor of said chute consists of a set of small stock-supporting rollers 94, 94, and at the upper, stock-receiving end of said chute a larger guide roller 95 is journalled on the frame structure 65 and adapted to receive the filler strip as the latter is drawn upward from the liner 80, between a pair of guides 96, 96, projecting from the frame structure 65, said guides being adapted to contact the broad faces of the flimsy filler strip in the manner heretofore described as to the slab strip and the guide rollers 22. The filler strip J may be so threaded, as shown, between the guides 96 and over the roller 95, that it passes onto the latter in an inverted position, the action of the guides 96 being improved by such inversion. A flanged, edge-guiding roller 97 is journalled on the upper end of the chute 93, for guiding the filler strip thereinto.

At the lower, delivery end of the chute 93 a flanged, edge-guiding roller 98 is journalled therein, close to the slab-strip-supporting roller 70, so as to align the filler strip just prior to its passage onto the combined slab strip and breaker strip as shown clearly in Fig. 9. 99 is a presser roller journalled on the outer ends of a pair of arms 100, 100, the latter being pivoted on the frame structure 65, as at 101, (Fig. 9), somewhat above the axis of the roller 70, so that the roller 99 is adapted to ride upon the work and press it against the roller 70, thereby compacting the work and also assisting to hold it in good driving engagement with the last mentioned roller. The arms 100 being pivoted not far from the axis of the roller 70, the force of gravity, supplemented by the driving force of the work, acts upon the roller 99 in a direction almost tangent to the roller 70, so that the pressure of the latter against the work, due to the consequent mechanical advantage, is greater than the weight of the roller 99.

*Pressing, side-wall-applying, and marking devices.*

The presser device M comprises a large, work-supporting and presser roll 102, (Fig. 1<sup>A</sup>), secured upon the driven shaft 18 which constitutes a part of the train of gearing 17 above described, said roll being adapted to receive the composite strip from the belt carrier C, and 103 is a presser roller adapted to co-operate with the roll 102, the roll 103 being journalled in journal blocks such as 104 mounted in vertical guideways formed in brackets on the frame A, and said journal blocks being adjustable in said guideways by means of adjusting screws such as 105 threaded through the usual bridge-plates, such as 106, spanning said guideways.

Secured upon the driven shaft 16 is a work-supporting roll 107 adapted to receive the work from the presser rolls 102, 103, and advance it into a storage loop K¹, to be drawn vertically therefrom, between a pair of guide rollers 108, 108, similar to the rollers 27, 27, above described, and a pair of guide rollers such as 109, similar to the rollers 22 above described, to the side-wall-applying device L.

Figure 10:
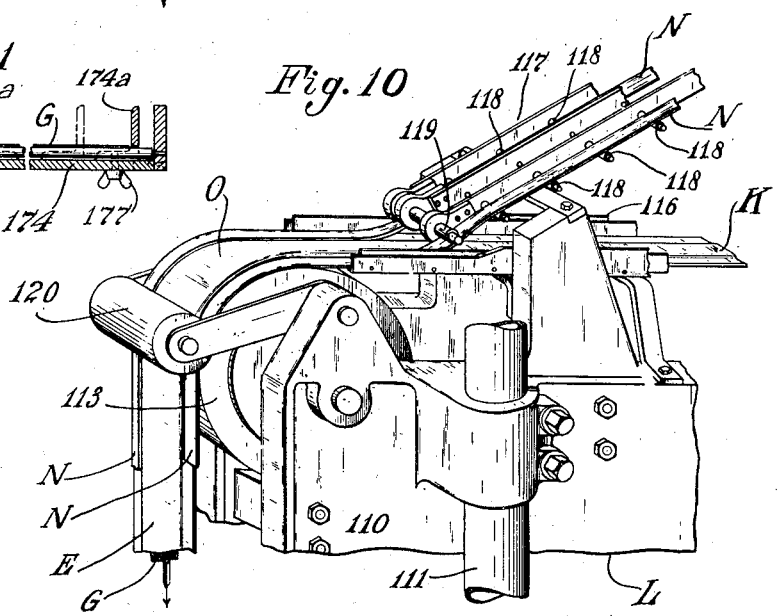
Fig. 10 is a similar view of a side-wall-applying mechanism and the work in place.
Figure 12:
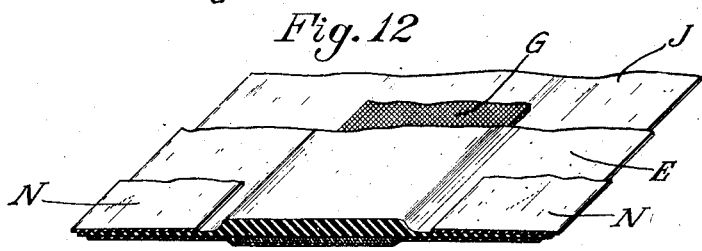
Fig. 12 is a sectional perspective view of a portion of an assembled tire tread.

Said device L comprises a frame structure 110 adjustably clamped upon vertical posts 111, 111, so that it may be raised or lowered to provide a suitable vertical rise of the composite strip K, from the storage loop K¹, for the proper turning and flatwise guiding of strips of different width or character, the strip K being inverted as it makes said vertical rise, so as to have its outer face uppermost, in the device L, to receive the side-wall strips. Journalled upon said frame structure are two work-supporting and driving rolls 112, 113, driven by a belt 114 from a pulley on the shaft 16, and a pair of guides, one of which is shown at 115, corresponding to the guides 172 above described, project from said frame structure for guiding the strip as it passes onto the roll 112. Secured upon the frame structure 110 is a guide trough 116, similar to the trough 173 above described, adapted to support the composite strip K from the roll 112 to the roll 113 and an inclined, double, guiding chute 117 for the side-wall strips N, is mounted thereover, being secured to the frame structure. Said chute comprises two guideways, a side member of the nearer guideway being omitted for clearness of illustration. The floor of each guideway consists of a set of strip-supporting rollers such as 118, 118, and at the delivery end of each guideway is journalled a guide roller such as 119 (Fig. 10) adapted to work upon the upper face of the side-wall strip to assure that the side-wall strip will pass onto the strip K from substantially the same direction notwithstanding increases of tension in the former such as may occur from retarding forces acting upon the strip nearer its source of supply. The parts described are so positioned as to cause the side-wall-strips to be drawn onto the strip K in proper alignment, as the latter passes to the delivery end of the guide trough 116, and a roller 120 corresponding to the roller 99 above described and similarly mounted is adapted to press the completely assembled strip O against the roll 113 as it passes downward thereover.

For supporting stock rolls such as 121 (Fig. 1<sup>A</sup>), in which the side-wall strips N, as brought to the apparatus, are interwound with a liner such as 122, brackets such as 123 are mounted adjacent the presser roll 103, and provided with pivoted arms such as 124 adapted to hold liner rewinding rolls such as 125 upon said presser roll as clearly shown in Fig. 1ᴬ, so that said rewinding rolls may be peripherally driven by said presser roll, thereby withdrawing the liner from the stock roll and so driving the latter to feed the side wall strips into storage loops such as N¹. Flanged guide rollers are mounted upon the frame structure 110 in position to guide the side-wall strips N from said storage loops into the respective guideways of the chute 117, the guide rollers for the nearer strip being shown at 126, 127. 128 is a flanged guide roller mounted on the frame A and adapted to guide the completely assembled strip O as the latter passes downward from the device L into a storage loop O¹.

The presser device P is in all respects similar to the presser device M above described, and is adapted to draw the strip O from the storage loop O¹, compact it, and pass it onto the endless belt carrier D.

The marking device Q comprises a pair of arms, one of which is shown at 129 (Fig. 1ᴬ), pivoted on the framework of the presser device P and journalled at their outer ends is a marker wheel 130 adapted to rest upon and be driven by the completely assembled tread strip O as the latter is carried forward on the belt carrier D. Said wheel is provided with a marker 131 projecting from its periphery, said wheel being adapted to rest upon and be driven by the tread strip, to mark the latter for cutting into suitable lengths to provide individual tire treads, wheels of different diameters being successively mounted upon the arms 129 for tire treads of different lengths. The endless belt of the carrier D is preferably thickly coated on its outer face with gum mastic, in order that an operator may cut into such coating, in severing the tread strip upon said belt, and thus avoid damage to the main body of the belt.

The motor 10 is provided with a starting and stopping switch 132, and, in order that the operation of the machine may be stopped by operators working at different stations thereon, is provided with an auxiliary stopping switch 133 (Fig. 3) of such design as to permit the motor to start when pressure on said switch is released. To stop the motor, the switch 133 is adapted to be actuated by a lever 134 secured to a rock-shaft 135, which extends the entire length of the machine and is provided with forwardly extending lever arms 136, 136, on which are mounted footboards, at closely spaced intervals. Each of the levers 136 has a rearwardly extending portion on which is secured a counterweight 137, for withdrawing the lever 134 from the switch when the footboards are released.

A relatively long lever 138 (Fig. 1) is secured to the rock shaft 135 beneath the solvent applying device, said lever extending rearwardly and having its free end secured to the lower end of a vertical rod 139, the upper end of which is bent forward to extend beneath the pivoted wick-holder 29, this arrangement being such that the wick 30 with its holder 29, is lifted out of contact with the tread-slab E whenever the foot-boards are depressed to stop the machine, thus avoiding an excessive deposit of solvent upon said tread-slab.

Operation.

In the operation of the apparatus the continuous slab strip E is formed by an operator joining together successive lengths of tread-slab stock upon the right-hand end portion of the carrier B as viewed in Fig. 1, and the resulting continuous strip is carried forward by the carrier B with its inner or breaker-strip receiving face uppermost, preferably being joined with their outer faces uppermost and then turned over, while the continuous breaker strip G is formed by another operator joining together successive lengths of breaker strip stock upon the carrier F. The slab strip E is advanced until its leading end is beyond the breaker-strip-applying and filler-strip-applying device 1, said slab strip being carried under the wick 30 of the solvent applying device, between the guides 27, 22, and 172, over the rolls 69, 70 and through the trough 173, between said rolls. Concurrently the breaker strip G is advanced through the festooning rack H, as clearly shown in Fig. 1, over the guide rolls 77, 77, 76 through the guide chute 174, and under the guide roller 75 and its leading end is started upon the slab strip, with allowance of material for the storage loop G¹. These operations may be facilitated by driving the apparatus by means of the main drive motor 10, Fig. 1ᴬ.

A roll 79 of filler strip stock J being mounted upon the standards 81 as shown clearly in Figs. 1 and 2, the liner 80 thereof is threaded about the guides 90 and 89 (Fig. 1) and started upon the liner-rewinding roll 86 while the filler strip J is drawn from said roll as shown, advanced between the guides 96, over the guide rollers 95, 97, through the chute 93, over the guide roller 98, and started upon the combined slab and breaker strip upon the roll 70 the resulting composite strip K being then further advanced, through parts the apparatus as shown, including the pressing device M, the apparatus preferably being driven, until the leading end of said strip is past the side-wall-applying device L, with allowance of material for the storage loop K, Fig. 1ᴬ, said composite strip being inverted as it is carried to said device L. Rolls 121 of side wall stock N being mounted as shown upon the brackets 123, their liners 122 are started upon the respective liner rewinding rolls 130

125 and the side wall strips N are carried over the guide rolls 127, 126, through the respective guideways of the chute 117, under the respective guide rollers 119, and started upon the composite strip K, a sufficient quantity of the liner 122 being drawn onto the roll 125 by hand, or before the side wall strips are started upon the strip K, to provide the storage loop $N^1$.

With allowance for the storage loop $O^1$, the complete strip O is advanced through the second pressing device P as shown, under the marker wheel 130 and onto the carrier D.

The apparatus is then ready for substantially continuous operation and is driven throughout by the motor 10 with only such stops of the latter as may be required in case of accident or in case the operator or operators who splice together the lengths of slab strip material are required to suspend operations while the other operators catch up in the matter of replacing side-wall or filler strip stock rolls or providing a supply of the continuous breaker strip. Very few stops are necessary as to the breaker-strip supply, however, as the breaker strip operator may be inactive for a time, releasing the clutch 48 to stop the feeding of the breaker strip from the carrier F into the festooning rack while the latter continues to supply the breaker strip, and the reserve in said rack may then be increased by depressing the bar $46^a$ and thereby actuating the motor 41 to drive the feeding-in roll 54 of the festooning rack faster than the other parts of the apparatus are driven by the motor 10.

The solvent applying device 29, 30, 31, progressively and automatically applies a suitable solvent to the inner face of the slab strip as the latter passes thereunder, so as to assure proper adhesion of the breaker strip and filler strip. The variable speed drive 20 may be adjusted to compensate for stretch in the slab strip occurring before the strength-giving breaker strip is combined with it, and the several storage loops $G^1$, $K^1$, $N^1$, and $O^1$, so provide for unequal feeding, stretching or shrinkage of the work at different parts of its course that stops for the purpose of increasing or decreasing the amount of material in said loops are not frequently required.

The materials being supplied as described, requiring but few operators for large production, the apparatus automatically combines the several strips of stock into a complete, composite tread strip and delivers it on the carrier D, marked to suitable lengths for individual treads, and said composite strip is severed as marked, upon the carrier D, by one or more operators, and the severed strips are suitably disposed of, as by rebooking them.

The provision of a pendant vertical reach of each of the flexible strips closely adjacent their point of junction permits very accurate guiding of said strips, but small lateral force being necessary to hold the hanging strip to the proper alignment, and the strip tending by gravity to align itself in a perfectly vertical position. The devices 1 and L being vertically adjustable, the length of the vertical reaches of the slab or the composite strip as the strip passes to said devices conveniently may be varied to correspond to the size or character of the strip, heavier or stiffer strips requiring a longer vertical reach for the proper guiding of the same. The liners 80 and 122, their respective rolls being peripherally driven by the work, rotate the stock rolls to draw off the comparatively weak and stretchable filler and side wall strips so that the latter are supplied at suitable rates without being subjected to excessive strain. The inclined guiding troughs or chutes for the filler strip and the side wall strips, floored with rollers, are highly advantageous in the guiding of the latter, since they provide a reach of considerable length in which the strips, being supported largely from the upper end of the chute, bear but lightly on the floor rollers, so that folded or wrinkled parts may readily slide laterally of the chute and so flatten out in accurate alignment.

The method and apparatus as described are adapted for the assembling with the other strips a tread-slab strip of full section, such as a tubed tread, as distinguished from the relatively light strips which heretofore have been combined in a laminated tread slab by feeding them into contact with each other, and we believe that we are the first to assemble heavy, full-section tread slabs in this way.

Various modifications of the invention are possible within the scope of the appended claims.

We claim:

1. Apparatus for making tire treads, said apparatus comprising means for longitudinally feeding a composite strip consisting of a plurality of tread material strips, and means for so guiding said tread material strips, including a full-section tread-slab strip as to cause them to be drawn progressively into contact with each other, to form said composite strip, as they pass to said feeding means, the means for guiding the tread slab strip comprising a roller mounted to support the strip in a slack reach and guides for the strip positioned within the limits of said reach.

2. Apparatus for making tire treads, said apparatus comprising a slab-strip carrier adapted for the joining thereon of successive lengths of tread-slab stock to form a continuous slab strip, feeding means for receiving said continuous slab strip from said carrier and feeding it forward, means for driving said feeding means and said carrier in a determinate speed ratio, a breaker-strip carrier adapted for the joining thereon of successive lengths of breaker-strip stock to form a continuous breaker strip, guiding means for said continuous breaker strip adapted to guide it onto said continuous slab strip, means interposed operatively between said breaker-strip carrier and said feeding means for availably holding a variable supply of breaker-strip, and means for alternatively driving said carriers in determinate speed ratio or independently of each other.

3. Apparatus for making tire treads, said apparatus comprising a slab-strip support adapted for joining thereon successive lengths of tread-slab stock to form a continuous slab strip, slab-strip feeding means adapted to receive said continuous slab strip from said support and feed it forward, a breaker-strip support adapted for joining thereon successive lengths of breaker-strip stock to form a continuous breaker strip, a festooning rack, including a feeding-in roll and a feeding-out roll, adapted to receive said continuous breaker strip from said breaker-strip support, means for receiving said continuous breaker strip from said festooning-rack and guiding it onto said continuous slab strip, means for driving said feeding-out roll in timed relation with said slab-strip-feeding means, and means independent of said driving means for driving said feeding-in roll.

4. Apparatus for making tire-treads, said apparatus comprising a slab-strip carrier adapted for joining thereon successive lengths of tread-slab stock to form a continuous slab strip and to deliver said continuous strip to a determinate position, slab-strip-feeding means, a roll over which the slab strip is drawn by said feeding means, said roll being so positioned as to cause said continuous slab-strip to rise vertically from said position, slab-strip-guiding means between said position and said roll for guiding the slab strip onto the latter, and means for guiding a strip of material onto said slab strip as the latter is fed by said slab-strip-feeding means.

5. Apparatus for making tire-treads, said apparatus comprising a slab-strip carrier adapted for joining thereon successive lengths of tread-slab stock to form a continuous slab strip and to deliver said continuous strip to a determinate position, slab-strip-feeding means, a roll over which the slab strip is drawn by said feeding means, said roll being so positioned as to cause said continuous slab-strip to rise vertically from said position, slab-strip-guiding means between said position and said roll for guiding the slab strip onto the latter, and means for guiding a strip of material onto said slab strip as the latter is fed by said slab-strip-feeding means, said slab-strip guiding means including a pair of guides positioned closer together than the width of the slab strip and so positioned with relation to said roll as to cause one margin of the slab strip to contact said roll in advance of the other.

6. Apparatus for making tire treads, said apparatus comprising means for feeding a slab strip to a determinate position, means for drawing said strip through a vertical reach from said position and further feeding it, means acting upon the vertical reach of said strip for guiding the same, and means for guiding a strip of material onto said slab strip at a more advanced position than that of said guiding means.

7. Apparatus for making tire treads, said apparatus comprising means for feeding a slab strip to a determinate position, means for drawing said strip through a vertical reach from said position and further feeding it, means acting upon the vertical reach of said strip for guiding the same, and means for guiding a strip of material onto said slab strip at a more advanced position than that of said guiding means, the guiding means for said slab strip comprising a pair of guides spaced closer together than the width of the strip but adapted to permit the passage of the slab strip between them in oblique relation to their guiding faces as viewed in horizontal section.

8. Apparatus for making tire treads, said apparatus comprising means for feeding a slab strip to a determinate position, means for drawing said strip through a vertical reach from said position and further feeding it, means acting upon the vertical reach of said strip for guiding the same, means for guiding a strip of material onto said slab strip at a more advanced position than that of said guiding means, and means for supporting one of said slab-strip feeding means at different heights to vary the length of said vertical reach.

9. Apparatus for making tire treads, said apparatus comprising means for feeding a slab strip to a determinate position, means for drawing said strip through a vertical reach from said position and further feeding it, means acting upon the vertical reach of said strip for guiding the same, means for guiding a strip of material onto said slab strip at a more advanced position than that of said guiding means, and means for driving the respective slab-strip feeding means at such different speeds as to compensate for the stretch of said slab strip incident to its vertical rise.

10. Apparatus for making tire treads, said apparatus comprising means for feeding a slab strip to a determinate position, means for drawing said strip through a vertical reach from said position and further feeding it, means acting upon the vertical reach of said strip for guiding the same, means for guiding a strip of material onto said slab strip at a more advanced position than that of said guiding means, and a variable-speed-drive interposed operatively between the respective slab-strip feeding means.

11. Apparatus for assembling laminated strip material, said apparatus comprising means for feeding a continuous strip of material, a stock-and-liner roll, a liner-rewinding roll mounted to bear upon and be driven by the said strip of material to rewind the liner from said stock-and-liner roll and thus to withdraw stock and liner from the first mentioned roll, and guides positioned to guide onto the said strip of material the stock so withdrawn from the stock-and-liner roll.

12. Apparatus for making tire treads, said apparatus comprising means for feeding a tread-slab strip, means for supporting a roll of filler strip stock and liner over said slab strip, means for supporting a liner-rewinding roll so that it will ride upon and be frictionally driven by the work to withdraw the filler strip from said roll, means for guiding said filler strip onto said slab strip, the last said means comprising guide rollers so positioned as to cause said filler strip to rise through a vertical reach, and guides acting flatwise against said filler strip as it passes through said vertical reach.

13. Apparatus for making tire treads, said apparatus comprising means for feeding a tread-slab strip, means for supporting a roll of filler strip stock and liner over said slab strip, means for supporting a liner-rewinding roll so that it will ride upon and be frictionally driven by the work to withdraw the filler strip from said roll, guiding means for said liner so positioned as to provide a reach of liner adapted to convey the filler strip, and means for guiding said filler strip through a vertical reach from said liner and onto said slab strip.

14. Apparatus for making tire treads, said apparatus comprising means for feeding a tread-slab strip, a slide mounted for transverse movement with relation to said slab strip as the latter is so fed, means on said slide for rotatably supporting a plurality of stock-rolls of tire-tread strip material with liners, means on said slide for supporting a plurality of liner-rewinding rolls so that one or another of the same may ride upon and be peripherally driven by the work to withdraw said strip material from the corresponding stock-roll, and means for guiding said strip material onto the slab strip, said slide being positionable to bring one or another of its stock rolls and the corresponding liner rewinding roll into operative position.

15. Apparatus for making tire treads, said apparatus comprising a plurality of endless-belt carriers adapted to convey longitudinally a continuous slab strip, slab-strip-feeding means positioned operatively between said carriers, and means for guiding a strip of tread material onto said slab strip as the latter is supported by said slab-strip-feeding means.

16. Apparatus for making tire treads, said apparatus comprising a plurality of endless-belt carriers adapted to convey longitudinally a continuous slab-strip, slab-strip-feeding means positioned operatively between said carriers, side-guiding means for guiding a strip of tread material onto said slab strip as the latter is supported by said slab strip feeding means, and means for pressing said strip of tread material onto said slab strip.

17. Apparatus for making tire treads, said apparatus comprising means for feeding a slab strip to a determinate position, means for drawing said strip through a vertical reach from said position and further feeding it, means for supporting one of said slab-strip feeding means at different heights to vary the length of said vertical reach, and means for guiding a strip of tread material onto said slab strip after it passes through said vertical reach, said guiding means being adjustable for strips of different width.

18. Apparatus for making tire treads, said apparatus comprising means for feeding a slab strip and means for guiding a strip of tread material onto said slab strip, the last said means comprising an inclined chute and a pair of side-guides mounted on said chute.

19. Apparatus for making tire treads, said apparatus comprising means for feeding a slab strip and means for guiding a strip of tread material onto said slab strip, the last said means comprising an inclined chute, and a series of strip-supporting rollers constituting the floor of said chute.

20. Apparatus for making tire treads, said apparatus comprising means for feeding a stretchable strip of rubber to a determined position and means for so drawing said strip therefrom through a vertical reach as to subject the strip therein to the tension only of its own weight, and means for securing one of the aforesaid means in different positions to determinately vary the height of said vertical reach and thus correspondingly to vary the tension of the strip at the upper part of the said reach.

21. Apparatus for making tire treads, said apparatus comprising means for progressively applying a strip of tire tread material longitudinally to a slab strip, means for feeding the resulting composite strip, and means for marking the latter at determinate intervals as it is so fed, the last said means comprising a wheel adapted to ride upon the work and a marker on said wheel.

22. Apparatus for making tire treads, said apparatus comprising means for longitudinally feeding a slab strip, a roller over which said slab strip passes, means for guiding a tread-material strip onto said slab strip before the latter passes from said roller, a pair of arms pivoted on an axis parallel with and adjacent the axis of said roller, and a presser roller journalled on said pivoted arms and adapted to run upon the work as the latter is carried upon the periphery of the first said roller.

23. Apparatus for making tire treads, said apparatus comprising means for progressively applying a strip of tire tread material longitudinally to a slab strip, and a belt carrier adapted to receive and carry forward the resulting composite strip, said carrier comprising a belt and a coating of plastic material thereon into which a knife may cut in severing the strip on said belt without injury to the latter.

24. Apparatus for assembling laminated strip material, said apparatus comprising means for drawing a continuous strip upward through a substantially vertical pendent reach, means for guiding said strip as it passes through said reach, and means for guiding another strip thereonto as it passes from said pendent reach.

25. Apparatus for assembling laminated strip material, said apparatus comprising means for drawing a continuous strip upward through a pendent reach, means for guiding said strip as it passes through said reach, and means for guiding another strip thereonto as it passes from said pendent reach, the said guiding means for the first mentioned strip comprising a member adapted to cause said strip to assume a torsional form in said pendent reach.

26. Apparatus for assembling laminated strip material, said apparatus comprising means for feeding a strip, a well of liquid positioned adjacent the path of said strip, and a wick having a part in said well, and another part adapted to drag upon said strip as the latter is fed thereunder, means for stopping the drive of the said feeding means, and means operatively connected with the said stopping means for lifting said wick out of contact with said strip when said feeding means is stopped, and means for guiding a second strip onto the first said strip after it has passed said wick.

27. Apparatus for assembling laminated strip material, said apparatus comprising means for feeding a strip, a well of liquid positioned adjacent the path of said strip, and a wick having a part in said well and another part adapted to drag upon said strip as the latter is fed thereunder, and a weight adapted to press said wick against the work, and means for guiding a second strip onto the first said strip after it has passed said wick.

28. The method of making tread-slab assemblies for tires which comprises providing a shrunk, full-section tread-slab strip having a plane face on one side and a raised medial zone on the other side, and applying a fibrous layer adhesively to the strip by guiding the two into progressive contact with each other while propelling them by engagement with their mutually adhering portions.

29. Tread-assembling apparatus comprising means for drawing past a plying position with its plane face uppermost a full-section tread-slab strip of rubber having a plane face on one side and a raised medial zone on the other side, means for effecting accurate alignment of the tread-slab strip at the plying position, means for guiding a strip of fibrous material into progressive contact with the exposed plane face of the tread-slab strip at the plying position, means for progressively pressing the two adhesively together, the said drawing means being constructed and arranged to draw the two strips by engagement with their mutually adhering portions, and means for effecting a longitudinal, progressive tensioning of the tread-slab strip as it passes to the plying position.

In witness whereof we have hereunto set our hands this 25 day of July, 1923.

WALTER B. FREEMAN.
URBAN C. HAREN.
FLORENZ P. HARTUNG.